Oct. 5, 1965     E. C. COLLINS ETAL     3,209,759
CAPACITY INCREASING ATTACHMENT FOR A THRESHER
Filed Nov. 30, 1962     2 Sheets-Sheet 1

Oct. 5, 1965 E. C. COLLINS ETAL 3,209,759
CAPACITY INCREASING ATTACHMENT FOR A THRESHER
Filed Nov. 30, 1962 2 Sheets-Sheet 2

INVENTORS
Edward C. Collins
Reynold Barkstrom
Atty

United States Patent Office 3,209,759
Patented Oct. 5, 1965

3,209,759
CAPACITY INCREASING ATTACHMENT
FOR A THRESHER
Edward C. Collins and Reynold Barkstrom, Moline, Ill.,
assignors to International Harvester Company, Chicago, Ill., a corporation of New Jersey
Filed Nov. 30, 1962, Ser. No. 241,383
2 Claims. (Cl. 130—27)

The present invention relates generally to improvements in combines and the like and more particularly to a new and improved attachment for adapting a conventional combine to more efficiently harvest windrow crops.

In the field of harvesting windrow crops it has been the general practice to windrow a wider swath than would be cut with a conventional platform on the combine. It is also possible to combine normal windrows of grain at a higher ground speed than what is normal for standing grain. However, it has been found that a conventional combine cannot accept this increase in volume without a corresponding decrease in efficiency. The present invention provides an attachment for a conventional combine that will enable it to handle an increased volume of windrowed crops without a corresponding decrease in efficiency.

The general purpose of this invention is to provide an attachment for conventional combines which embraces all the advantages of similar employed combines and possesses none of the aforedescribed disadvantages. To attain this, the present invention contemplates a unique concave extension, material handling means and stone retarder whereby the combine can efficiently accept the increase in volume brought about by the wider swath and higher ground speeds. An object of the present invention is the provision of a combine that is adapted to handle an increased capacity of windrowed crops.

Another object is to provide an attachment for a conventional combine that will particularly adapt the combine for handling windrow crops.

A further object of the invention is the provision of an attachment for a combine adapted to handle increased volumes of material by the use of special material handling means and a concave extension.

Still another object is to provide an attachment for a combine that especially adapts the combine for handling increased volumes of windrow crops and also includes an easily accessible stone retarding means.

Figure 1:
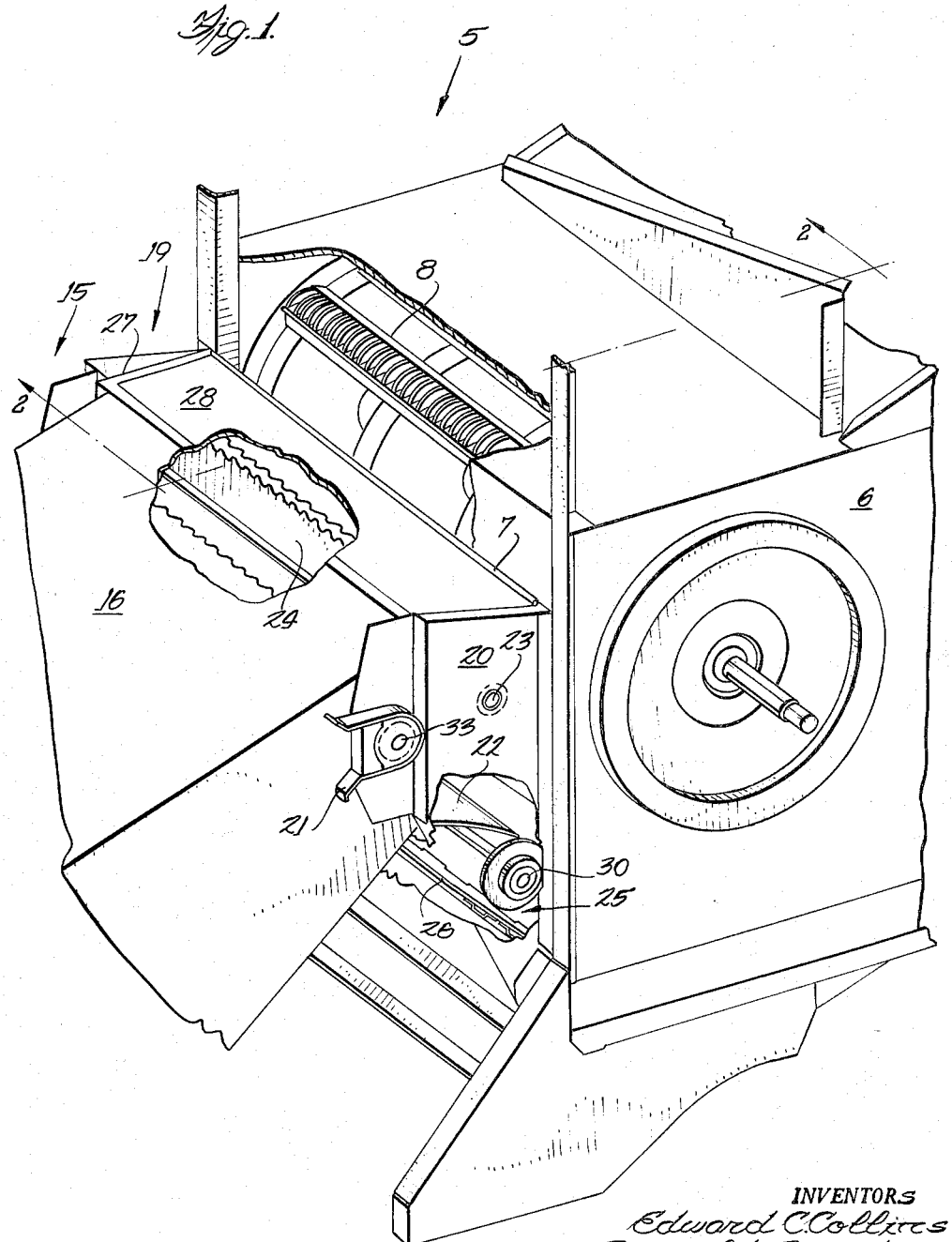
Figure 2:
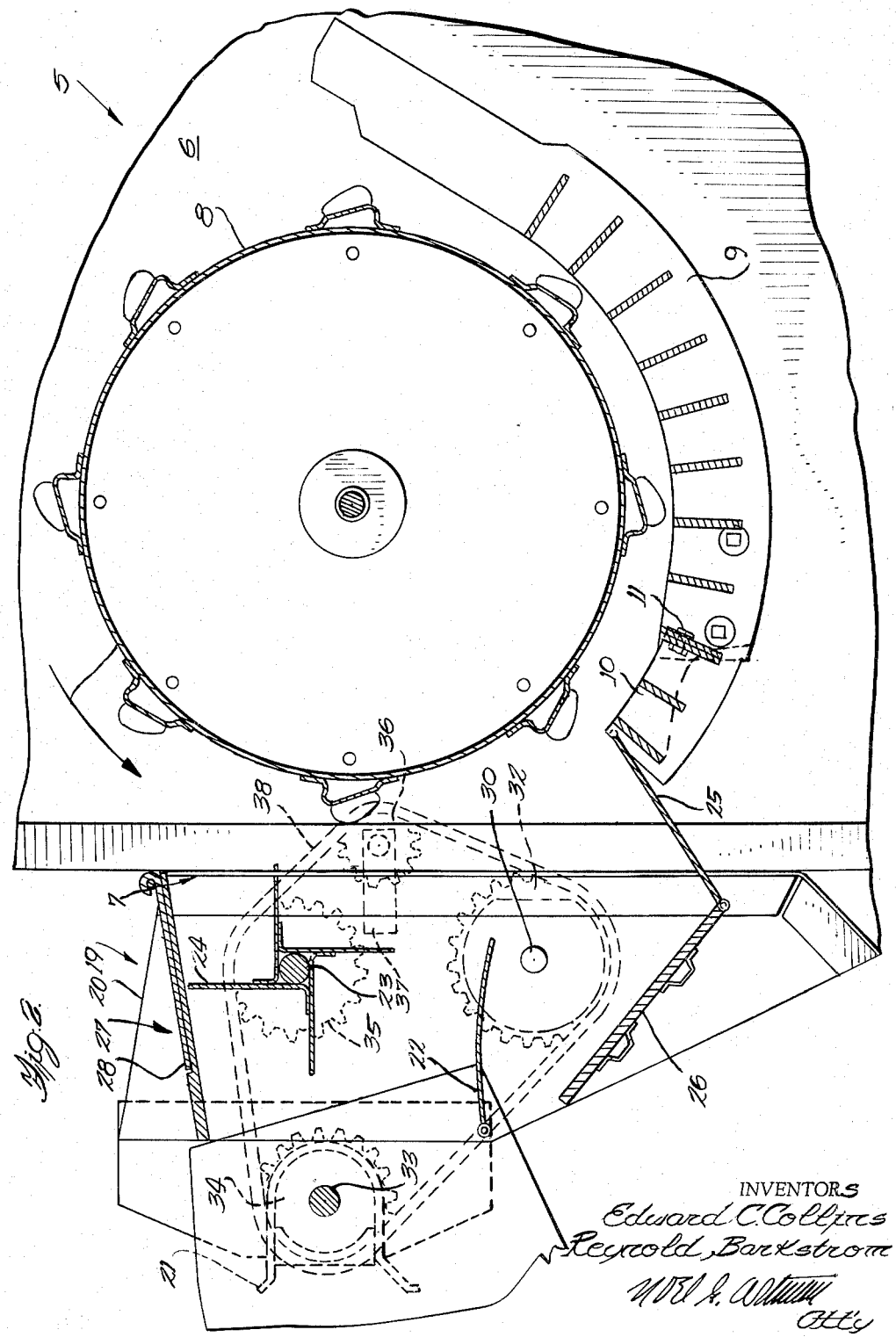

These and other objects of the invention will become more apparent from the specification and drawings wherein:

FIGURE 1 is a perspective fragmentary view of a conventional combine and feeder having portions broken away and shown in section and having the new and improved windrow attachment thereon; and FIGURE 2 is a cross-sectional view taken along lines 2—2 of FIGURE 1.

Referring now to the drawings wherein like reference characters designate like or corresponding parts throughout the several views there is shown in FIGURE 1 a combine 5 including a body portion 6 having a material receiving opening 7 formed therein. The body portion of the combine carries a rotary thrasher cylinder 8 which coacts with the concave 9 (not shown in FIGURE 1) in a conventional manner. A platform generally designated 15 having a feeder portion 16 is pivotally mounted on the feeder mounting attachment 19 about the material receiving opening. Material is fed from the feeder 16 through the feeder mounting attachment 19 into the combine and between said cylinder 8 and concave 9. This is a conventional combine construction a detailed disclosure of which can be found in the patent to R. L. Worrell et al. No. 2,705,961 of April 12, 1955.

Referring now to FIGURE 2, it will be seen that a concave extension 10 is secured to the regular concave 9 as by bolts 11. This increased length in the concave increases the concave area and thereby makes it possible to thrash a greater volume of material at a given time. It is apparent, however, that by extending a concave upwardly and forwardly that the conventional material feeding mechanism of a combine would no longer be adequate to direct the material between the concave and the cylinder. Furthermore, it is not only a matter of properly directing the material but the material feeding mechanism must also be adequate to handle the increased volume of material.

The feeder mounting attachment 19 generally comprises a pair of mounting brackets 20 which are adapted to be secured to the front portion of the combine about the material receiving opening. Said mounting brackets 20 have a generally elongated shape and are secured to the combine in a vertical position along one of their longitudinal edges. A feeder pivot mount 21 is provided in the mounting brackets along the upper portion of the outer longitudinal edge. These feeder mounts are located higher than their corresponding elements on a conventional combine to accommodate for the extension of the concave. A material guiding means 22 connects the pair of mounting brackets 20 and extends generally horizontally from one of the bracket's longitudinal edges towards the space between the cylinder and the concave but terminates short of the concave. When material is delivered by the feeder 16 into the feeder mounting attachment 19, it will follow the material guiding means 22 which directs it towards the opening between the cylinder 8 and the concave extension 10. However, since the material guiding means 22 does not extend completely to the concave extension 10, the material must bridge a gap between said material guiding means 22 and the concave extension 10. When the material bridges this gap trash such as stones will fall by gravity through the gap into the trough-shaped bottom 25 which connects the lower portions of said mounting brackets 20. The trough-shaped bottom 25 has a door 26 mounted therein which is easily accessible and provides a means for removing the trash from the trough-shaped bottom. A feed beater shaft 23 is journaled in the mounting brackets 20 at a point above the feeder pivot mounts and overlying the material guiding means 22. Because of the elevated position of the feeder pivot mounts, the material supplied to the feeder mounting attachment by the feeder 16 will be delivered at a rather steep angle to the horizontal and means must be provided to turn the material in a downwardly direction towards the opening between the cylinder 8 and the concave extension 10. A feed beater 24 is mounted on feed beater shaft 23 for this purpose. The feed beater rotates in a counterclockwise direction as seen in FIGURE 2 and is located with respect to the feeder pivot mounts such that its paddles would contact the material received from the feeder 16 and in cooperation with the material guiding means 22 will change the direction of the material such that it will be received between the cylinder 8 and the concave extension 10. The feed beater also functions to shake the material such that heavy trash such as rocks will fall through the material to be deposited in the trough-shaped bottom 25 when the material bridges a gap between the material guiding means and the concave extension. A top 27 is provided for the feeder mounting attachment 19 and includes a door 28 which can be used to clean or untangle the feed beater 24.

A power transmission shaft 30 is journaled in the mounting brackets 20 at a point beneath the material guiding means 22. A portion of shaft 30 extends outwardly from the left end mounting bracket 20 and carries a pulley through which power is supplied to shaft 30. Shaft 30 also extends outwardly from the right hand mounting bracket 20 and carries on this end portion a sprocket wheel 32. Although the power transmission shaft 30 extends across the inside of the feeder mounting attachment, it does not interfere with the movement of material since it is protected by the material guiding means 22. The feeder 16 has a feeder drive shaft 33 at its upper end which carries a sprocket 34 in alignment with the sprocket 32 of the power transmission shaft. The feed beater shaft 23 has a portion extending outwardly of the right hand mounting bracket 20 which carries a sprocket 35 also in alignment with sprockets 32 and 34. An idler sprocket 36 is mounted on an arm 37 extending from the right hand mounting bracket 20. An endless chain 38 is carried by sprockets 32, 34, 35 and 36. The power received by the pulley is transmitted through the power transmission shaft 30 to the sprocket wheel 32 and is then transmitted through the endless chain 38 to both the feeder sprocket 34 and the feed beater sprocket 35.

In operation the combine is driven down a windrow and the material is directed up the feeder 16 where its upper movement is intercepted by the feed beater 24 which turns the direction of the material downwardly and cooperates with the material guiding means 22 to spread the material evenly and shakes it such that any stones or heavy trash is dislodged from the material and falls within the trough-shaped bottom 25 when the material bridges the gap between the material guiding means and the concave extension. Once the material is fed between the cylinder and the concave it is thrashed in the usual manner differing only in the fact that because of the concave extension there is an additional area to accommodate for the increased volume.

It has been found that a stone retarding means in an attachment such as this is very desirable since by increasing the volume of material handled the volume of stones and trash naturally increases. Also when the speed at which the combine is run increases, the stones per volume of material also increases since the material is moving at a faster rate and can hold more and heavier stones.

Thus it is seen that an attachment for a conventional combine has been provided that will enable wider swaths of window crops to be harvested at a greater forward speed in which means are provided for retarding the stones from entering the area of the concave and in which the thrashing area of the concave has been increased to accommodate the increased volume of the combine.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A capacity increasing attachment for a combine comprising; a concave extension adapted to be releasably secured to the front edge of the combine concave, a pair of elongated mounting brackets adapted to be secured along their first elongated edges to a combine, mounting means on the second longitudinal edges for pivotally mounting a combine feeder at a point above the cylinder axis of the combine, a trough-shaped rock collecting container connecting the lower portions of said brackets and extending from said second elongated edges of said brackets to the front edge of said concave extension, a material guiding plate connecting said brackets below said mounting means and extending from said first edges toward said second edges but terminating between said edges so that it terminates forward of the concave extension to provide a gap above the rock collecting container, a rotary feed beater element carried by said brackets at a point overlying said material guiding plate so that the rotary feed beater axis is in substantial vertical alignment with the rear edge of said guiding plate and above said mounting means such that material being received from the feeder portion will be engaged by said feed beater and conveyed along said material guiding plate towards said concave extension.

2. The invention as set forth in claim 1 wherein a top cover including an access door connects the brackets above said feed beater.

References Cited by the Examiner

UNITED STATES PATENTS

| | | | |
|---|---|---|---|
| 1,553,584 | 9/25 | Anderson | 56—210 |
| 2,528,232 | 10/50 | Krause | 130—27.9 |
| 2,630,667 | 3/53 | Krause | 56—208 |
| 2,812,766 | 11/57 | Goffnett | 130—27.9 |
| 3,124,138 | 3/64 | Class | 130—27 |

FOREIGN PATENTS

| | | |
|---|---|---|
| 467,475 | 8/50 | Canada. |
| 1,130,640 | 5/62 | Germany. |

ANTONIO F. GUIDA, *Acting Primary Examiner.*

ARNOLD RUEGG, *Examiner.*